Jan. 26, 1937.  R. D. MacDONALD  2,068,886
COMBINE BALER
Filed Jan. 24, 1931  9 Sheets-Sheet 7

Inventor
Raymore D. MacDonald
by Parker & Carter,
Attorneys.

Patented Jan. 26, 1937

2,068,886

UNITED STATES PATENT OFFICE 2,068,886

COMBINE BALER

Raymore D. MacDonald, Shelbyville, Ill., assignor to Ann Arbor Machine Company, Shelbyville, Ill., a partnership composed of L. K. Tallman, G. L. Tallman, J. L. Tallman, and Emma S. Tallman Application January 24, 1931, Serial No. 510,891

3 Claims. (Cl. 100—25)

This invention relates to a baler and particularly to a combine baler in which baling means are combined with means for picking up material to be baled. In the particular form illustrated herewith, a pick-up, adapted to pick up hay, straw and the like from the fields, is shown as mounted upon, adapted to move and to co-operate with a baling mechanism so that as the machine is drawn through the fields it will pick up material from the surface of the ground, move it to the baling assembly, compress and bale it in bales.

One object of the invention is, therefore, to provide a combined pick-up and baler. Another object is to provide a pick-up and baler, balanced on two wheels and with or without a self-feeder, and arranged to be driven by means of a power take-off from a tractor. Another object of the invention is to provide in connection with such a mechanism an improved block dropping and handling mechanism in which the blocker, which may slide in a vertical position, serves as a portion of the hopper through which the material passes into the baling unit. Another object of the invention is to provide in connection with a combine baler an automatic control for the pick-up driving mechanism so that the latter is drawn out of operation automatically when the pick-up is moved into an inoperative position. Another object of the invention is to combine in the transmission the main driven shaft of the transmission with the fly wheel and driving pinion, thus eliminating the conventional flywheel shaft heretofore used.

Other objects will appear from time to time in the specification and claims.

My invention is illustrated more or less diagrammatically in the accompanying drawings, wherein—

Like parts are designated by like characters throughout the specification and drawings.

The baler as a whole is provided with suitable framework elements to form in effect a chassis. These frame elements are designated generally by the letters A. The specific details of this framework will not be discussed more fully. It is sufficient that a framework is provided which will support the wheels and support the working parts in the proper relationship to permit correct operation. Supporting wheels $A^1$, $A^1$ are provided and they are carried by an axle $A^2$.

Running generally longitudinally from front to rear of the machine is a framework of rectangular cross section, which is preferably formed of angular members B, B. A bottom $B^1$ is provided and runs preferably from end to end of the rectangular framework. Throughout a portion of the length of the framework a top $B^2$ is provided, being situated generally to enclose or cover the top of the rear half of the rectangular framework above mentioned. Along the central portion of the rectangular framework formed by the members B are provided sides $B^3$, $B^3$. The sides are shown as being terminated at $B^4$ in Figure 1, slightly in the rear of the supporting and spacing frame members $B^5$, $B^5$. Generally adjacent the frame members $B^5$ the sides $B^3$ are provided with one or more openings or perforations $B^6$. Adjacent these perforations are mounted dogs $B^7$ which have inclined points or noses $B^8$ positioned to extend through the openings $B^6$. Springs $B^9$ are positioned to force the dogs inward through the openings $B^6$ into the position indicated in Figure 2. Pivotally mounted adjacent the rear end of the rectangular frame formed by the members B, is a closing member $B^{10}$. It may be retained in the position shown in Figure 1 or may swing downwardly from that position to a generally horizontal position to permit discharge of bales from the machine. The upper and lower frame members B in the rear of the vertical frame members B⁵ are not rigidly attached to each other and some spreading or relative separation of the upper and lower frame members may occur. Spacing members or bars B¹¹ are fastened to each of the lower frame members B as at B¹² and engage cross members as at B¹³ on the upper frame members. The members B¹¹ preferably extend above the frame members B and have compression springs B¹⁴ positioned about their upper ends so as to exert compression to tend to force the upper and lower frame members together. Handles B¹⁵ are positioned on the upper ends of the members B¹¹ above the springs B¹⁴ and may be manipulated to adjust the compression. At their forward ends the upper frame members B are downwardly bent as at B¹⁶ and attached to the lower frame members B as at B¹⁷. A piston B¹⁸ of generally rectangular cross section is positioned within the rectangular frame formed by the members B and is adapted to be reciprocated in this frame in the manner which will be described below. The piston is preferably hollow for lightness, as shown, and has a pair of ears B¹⁹ formed on the inside of its head, to which a connecting rod B²⁰ may be fastened. Depending downwardly from the rectangular frame is a support B²¹, to which one or more foot boards B²² may be fastened adjacent their forward ends. At their rear ends they are movably supported by hangers B²³ which depend downwardly from the frame. This construction is to permit the relative swinging or raising of the rear end of the foot boards, as indicated in dotted lines in Figure 1.

Figure 11:
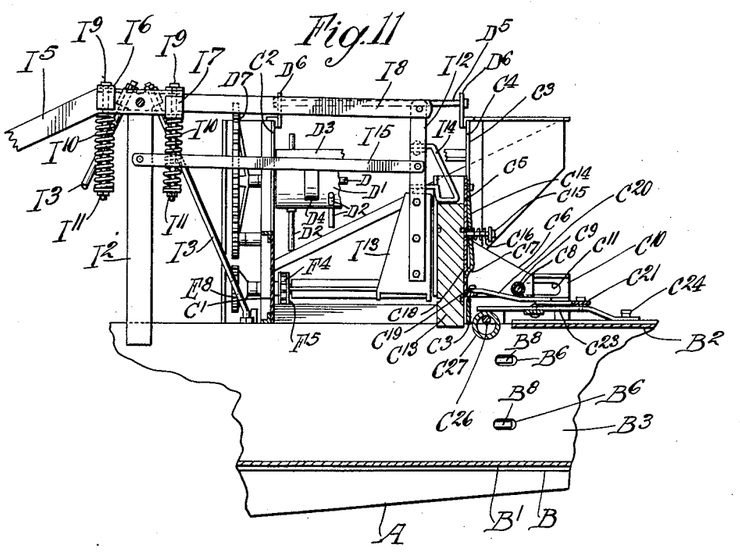
Figure 11 is a longitudinal vertical cross sectional detail, showing the plunger in the lowered position.

Positioned above the rectangular framework formed of the angular members B, is an open topped, three-sided housing, having one wall flared outwardly as at C, and a second wall C¹ being flat and cut away as at C². A third wall C³ is cut away or provided with a larger opening as at C⁴. Outside of and spaced away from the wall C³ and generally opposite the opening C⁴ is a movable wall portion C⁵, provided with rearwardly extending brackets C⁶. At their lower edges the brackets are provided with laterally extending runner-like flanges C⁷. Adjacent their outer edges or ends the members C⁶ are joined by a rod C⁸ which has loosely mounted upon it a tubular member C⁹. The flange-like portions C⁷ are engaged in fixed track members C¹⁰ which are positioned on the framework and are provided with slots C¹¹ through which the rod C⁸ extends. These slots, together with the rod, serve as guides or retaining parts for the wall member C⁵. The wall member C⁵ is formed with inwardly facing flanges C¹², as indicated particularly in Figure 12, and it thus serves as a retaining and guiding member for the blocks C¹³. Positioned on the wall member C⁵ is a spring C¹⁴ which may be perforated to permit a member such as a bolt or screw C¹⁵ to extend through it. Positioned about the member C¹⁵ is a spring C¹⁶, which bears against the spring C¹⁴ and tends to force its inner end C¹⁷ through a perforation C¹⁸ in the wall member C⁵ and thus to hold it by friction against the block C¹³ and to tend to retain the block within the guideway formed by the wall member C⁵ and its flanges C¹². All of this construction is shown in detail in Figures 11 and 12 and generally in Figures 1 and 4. C¹⁹ is an ear or other attaching part formed on the wall member C⁵ and preferably extending rearwardly from it and adjacent its rear edge. A link C²⁰ is joined to the ear C¹⁹ at one end and at the other end to one portion of a lever arm C²¹. This lever is pivoted as at C²² on a flat spring member C²³ which is itself fastened upon one of the frame members B, as at C²⁴. Two such spring members C²³ may be used. A helical spring C²⁵ is fastened, one end upon the frame member B and the other end to the link C²⁰ and tends to hold the link C²⁰ and the lever arm C²¹ in the full line position of Figure 12. Adjacent the wall member C³ and extending across the top of the rectangular frame formed by the members B, is a rod C²⁶ upon which is loosely mounted a tubular member C²⁷. The outer or free end of the spring C²³ rests upon the tubular member C²⁷ and tends to hold it in the position indicated in Figure 4.

I have described the structure which surrounds or forms the enclosure of three sides of the housing which is positioned above the rectangular frame member. The fourth side of this housing is open to permit communication with and discharge from a conveyor so that material moved by the conveyor may be discharged into the housing.

Positioned adjacent the open or fourth side of the housing and mounted in suitable bearings is a shaft D upon which is mounted a cylinder or drum-like portion D¹ which forms the body of a beater adapted for co-operation with a conveyor. A plurality of preferably curved fingers D² is positioned on the beater. An angle D³ extends transversely between the walls of the housing and carries a plurality of preferably curved stripper fingers D⁴. Extending across the open side of the housing and above the beater is a rod D⁵ which may be carried by members D⁶ which project upwardly above the side walls of the housing. At the outer or free end of the shaft D is a sprocket or driven member D⁷ by means of which the beater may be rotated from any suitable power source and by any suitable gearing. The particular drive embodied in the present machine will be described below.

Extending across the machine from the housing above described is a housing or apron having a closed bottom and formed of side members E, E. At one side a relatively short apron E¹ bounds an open side and extends toward a pick-up conveyor, permitting discharge from the pick-up conveyor over the side E adjacent the apron E¹. On the opposite side a larger, outwardly flared side member E² is positioned. E³ is an end wall extending between the side walls E, E and the apron E¹ and the flared portion E². Positioned in suitable bearings between the walls E, E and adjacent the end wall E³ is a shaft E⁴ carrying at either end sprockets E⁵. Positioned adjacent the opposite ends of the walls E is a second and generally similar shaft E⁶ which carries sprockets E⁷ and at its outer or exposed end a driven sprocket E⁸. Extending between the shafts E⁶ and E⁴ is a platform member E⁹ which may be carried on suitable supports E¹⁰ fixed to the side walls E, E and is preferably downwardly curved about the shafts E⁴ and E⁶ as at E¹¹. Conveyor chains E¹² are positioned about and engage the sprockets E⁷ and E⁵. Extending between the chains are conveyor slats E¹³.

Positioned adjacent the inner or discharge end of the horizontal conveyor formed of the chains E¹² and the slats E¹³ is a relatively short inclined conveyor.

Figure 7:
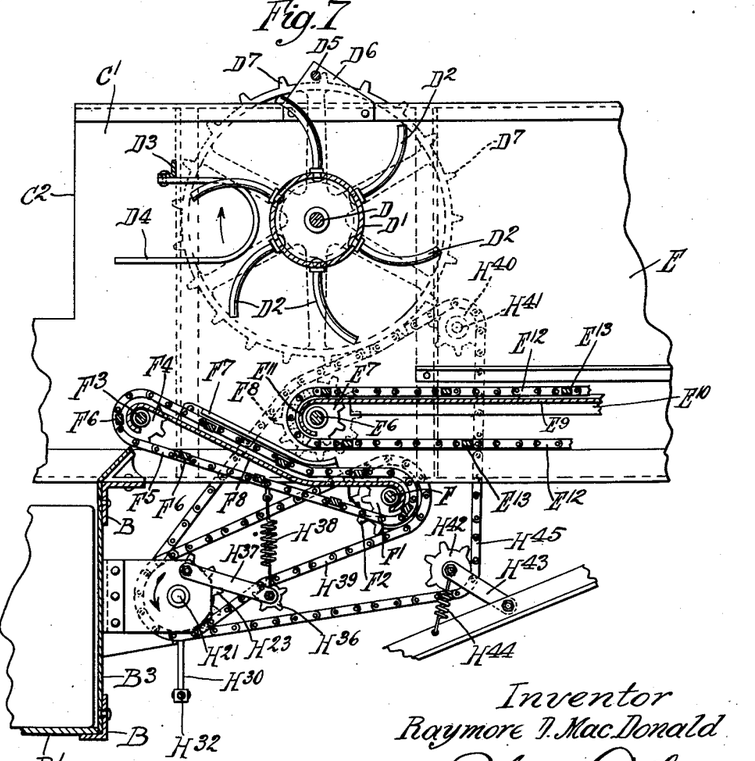
Figure 7 is a transverse vertical cross sectional detail taken at line 7—7 of Figure 5.

A shaft F is carried in suitable bearings supported upon the side walls E and carries a pair of sprockets F¹, F¹. At its outer or exposed end it carries a sprocket F² by means of which it is driven. F³ is a shaft carried in suitable bearings mounted between the side walls $C^1$, $C^3$ and carrying sprockets $F^4$. Positioned about and engaging the sprockets $F^1$ and $F^4$ are conveyor chains $F^5$. Extending between the chains $F^5$ are slats $F^6$. Guide members $F^7$ are positioned upon the walls of the housing, as indicated in Figure 7, to cause the chains to travel along the inclined paths indicated in that figure. $F^8$ is a platform member extending between the shafts $F$ and $F^3$ and preferably downwardly bent about them as indicated in Figure 7.

Figure 5:
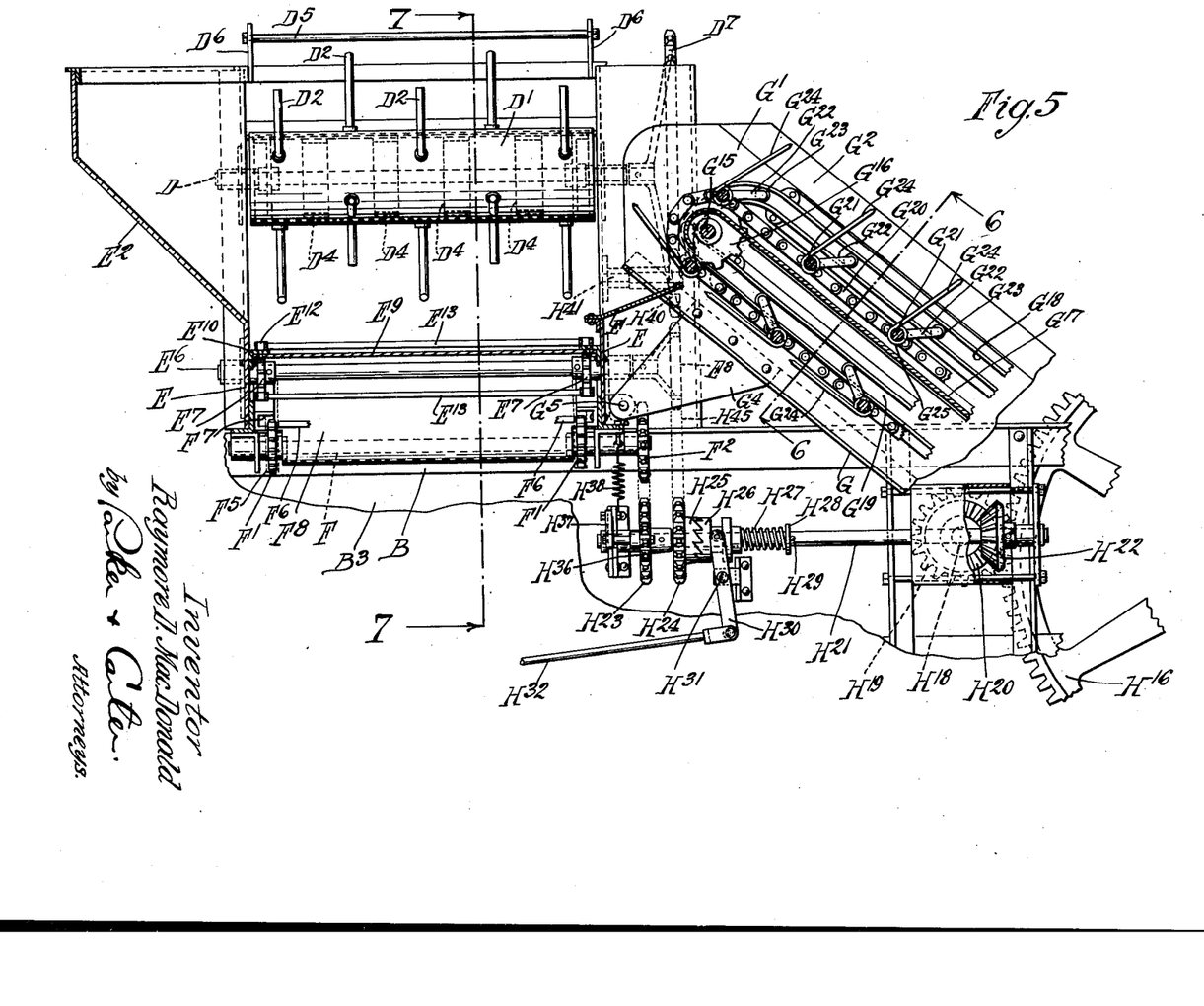
Figure 5 is a fragmentary vertical longitudinal cross sectional detail, taken at line 5—5 of Figure 3.
Figure 6:
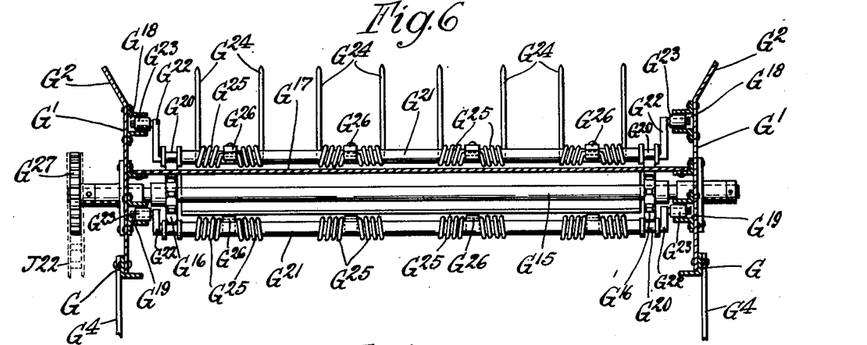
Figure 6 is a transverse vertical cross sectional detail, taken at line 6—6 of Figure 5.
Figure 8:
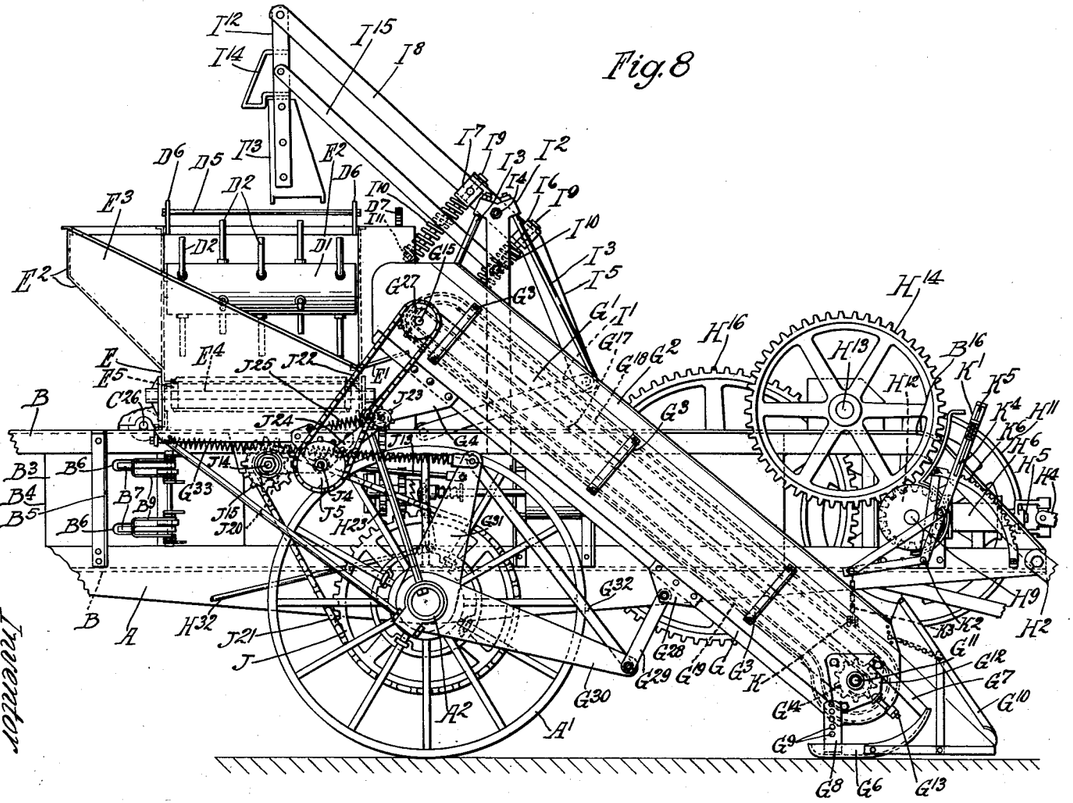
Figure 8 is a partial side elevation, showing the forward end of the machine from the side opposite that shown in Figure 1, with parts broken away.
Figure 9:
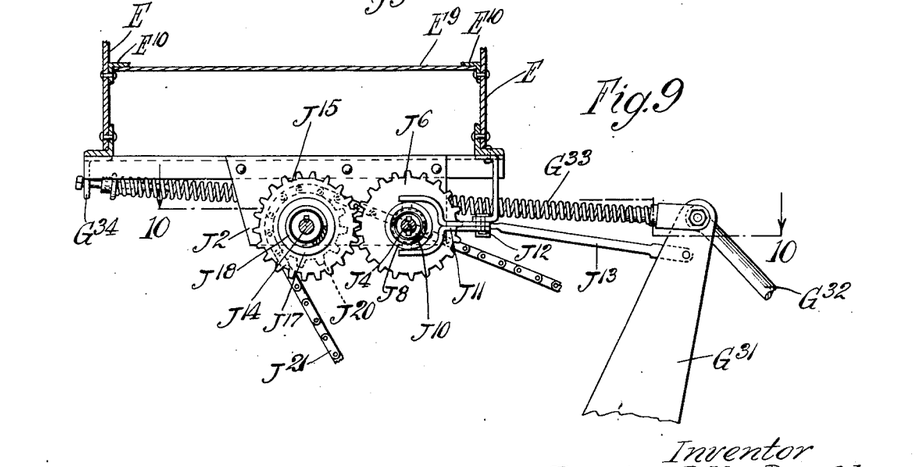
Figure 9 is an enlarged vertical sectional detail, taken at line 9—9 of Figure 3.

$G$, $G$ are frame members which form a part of the frame of a pick-up conveyor. They are attached to side wall members $G^1$, $G^1$ which may be outwardly flared along their upper edges as at $G^2$ and may carry stiffening and reinforcing members $G^3$ along their sides. The details of the frame construction of the header will not be further described. It is sufficient to say that a framework is formed which is made of suitable members and is sufficiently rigid to carry the necessary parts and to hold them in alinement and in proper working relation. Depending downwardly from the frame members $G$ are brackets $G^4$, preferably one on each side of the pick-up frame, which are supported on any suitable portion of the frame of the machine as a whole, as at $G^5$. At the lower end of the pick-up frame is mounted a pair of ground contacting shoes $G^6$. Each shoe, at its forward end, is upwardly turned, as indicated particularly in Figure 8, and is attached to the frame by a link $G^7$. Adjacent its rear end it is fastened to the frame by a supporting member $G^8$ which is provided with a plurality of perforations $G^9$ by means of which it may be adjustably fastened to the frame so as to vary the distance between the frame and the ground contacting shoe. A plurality of outwardly flared grain contacting and engaging members $G^{10}$ are mounted, one on each side of the pick-up frame. $G^{11}$ is a conveyor shaft mounted in suitable bearings in bearing supporting plates $G^{12}$ which are adjustably positioned adjacent the lower end of the pick-up conveyor. Adjusting bolts $G^{13}$ are provided for each of the plates $G^{12}$ so that the shaft may be moved slightly to act as a take-up for the belt and carry out any other adjustments necessary. The shaft $G^{11}$ carries sprockets $G^{14}$. Adjacent the upper end of the pick-up conveyor is a shaft $G^{15}$ which is carried in suitable bearings and has mounted upon it sprockets $G^{16}$. The platform member $G^{17}$ is mounted between the side walls of the pick-up conveyor and extends from the shaft $G^{11}$ to the shaft $G^{15}$ and is preferably downwardly bent about each of the shafts as indicated in Figure 5. A guide track $G^{18}$, which may be in the form of a channel, extends the length of the pick-up conveyor and lies above it. It is spaced outwardly from the path of movement of the chain which will be described below. A similar track $G^{19}$ extends the length of the conveyor and is spaced below it and closer to the path of movement of the chain. The two tracks join each other and are in effect one track, forming a closed circuit about the shafts $G^{11}$ and $G^{15}$. Conveyor chains $G^{20}$ are positioned about the sprockets $G^{16}$ and $G^{14}$. These chains have pivotally mounted in them cross shafts $G^{21}$, each of which carries at its ends a crank arm $G^{22}$ which has mounted upon its free end a roller $G^{23}$. These rollers ride within the tracks $G^{18}$ and $G^{19}$ and cause the cross shafts $G^{21}$ to rotate as the rollers move from the tracks $G^{18}$ to the tracks $G^{19}$. Mounted upon the cross shafts $G^{21}$ are a plurality of spring fingers $G^{24}$ which are preferably provided with spring portions $G^{25}$ wound about the shafts $G^{21}$ and fixed to them by clips or otherwise as at $G^{26}$. $G^{27}$ is a driving sprocket mounted on the outer end of the shaft $G^{15}$. On either side of the frame of the pick-up conveyor is a bracket member $G^{28}$ to each of which is pivoted an inwardly bent connecting link $G^{29}$. At their inner ends these are joined to a lever arm $G^{30}$ which is fixed to the axle $A^2$. Extending upwardly from the axle and fixed to it at an angle of approximately 90 degrees to the arm $G^{30}$, is a second similar and preferably shorter arm $G^{31}$. A tie rod $G^{32}$ connects and stiffens the arms $G^{30}$ and $G^{31}$. To the upper end of the arm $G^{31}$ is connected one end of a counter-balancing spring $G^{33}$ which has its other end connected to a bracket $G^{34}$ which is positioned upon and preferably depends downwardly from one wall $E$ of the lateral conveyor, as shown in Figure 8, and in detail in Figure 9.

The combine baler as indicated in the drawings is generally adapted to be drawn through a field to pick up, for example, hay, to bale it and discharge the bales as it moves. It may, of course, be used as a stationary machine. When used as a moving machine it will be attached normally to a tractor, one wheel of which is indicated as at $H$. The tractor has a draft bar $H^1$ which is attached to downwardly depending draft connections $H^2$, $H^2$, which are formed on and attached to the forward end $B^{17}$ of the combine frame. A power take-off connection $H^3$ extends rearwardly from the tractor, by means of a transmission shaft $H^4$, through suitable universal joints, is connected to and adapted to drive the shaft $H^5$ on the combine. The shaft is preferably mounted within suitable bearings which are carried in a housing $H^6$ which is attached to a second housing $H^7$. On the inner end of the shaft $H^5$ is a beveled gear $H^8$. Positioned within suitable bearings in the housing $H^7$ is a shaft $H^9$ which has fixed upon it a beveled gear $H^{10}$, meshing with the beveled gear $H^8$. At one end the shaft $H^9$ carries a fly wheel $H^{11}$. At its opposite end it carries a driving gear or pinion $H^{12}$. Carried in suitable bearings preferably above and to the rear of the shaft $H^9$ is a second shaft $H^{13}$. At one end this shaft carries a gear $H^{14}$ which meshes with the pinion $H^{12}$ and at its opposite end it carries one or two pinions $H^{15}$ which mesh with a double driving gear $H^{16}$, carried upon a third discontinuous shaft $H^{17}$. The connecting rod $B^{20}$ is fastened as indicated particularly in Figure 4, preferably between the two gears $H^{16}$. A fourth shaft $H^{18}$ is carried in suitable bearings within the frame and has mounted upon it a pinion $H^{19}$ which meshes with one of the gears $H^{16}$. On the shaft $H^{18}$ is also carried a beveled gear $H^{20}$. The four driving shafts so far described, namely, $H^9$, $H^{13}$, $H^{17}$ and $H^{18}$, extend transversely of the frame. A fifth driving shaft $H^{21}$ is carried in suitable bearings and extends longitudinally of the machine. A beveled gear $H^{22}$ on it, meshes with the beveled gear $H^{20}$ on the shaft $H^{18}$. A sprocket $H^{23}$ is fixed on the shaft $H^{21}$. A second sprocket $H^{24}$ is loose on the shaft $H^{21}$. It is provided with a toothed or notched hub $H^{25}$ which is adapted to mate with a similarly notched clutch member $H^{26}$ which is normally held in engagement with it by a spring $H^{27}$ positioned about the shaft $H^{21}$ and bearing against a washer $H^{28}$ which is pinned against movement along the shaft $H^{21}$ by a pin $H^{29}$, as shown in detail in Figure 5. A clutch operating lever $H^{30}$ is pivotally mounted as at $H^{31}$. An operating link $H^{32}$ for the clutch is fastened at one end to the lever $H^{30}$ and at its other end to the short arm of a foot operated lever $H^{33}$ which is pivoted as at $H^{34}$ and provided with a pedal portion $H^{35}$ positioned adjacent one of the foot boards $B^{22}$. An idler $H^{36}$ is carried in an arm $H^{37}$ and by means of a spring $H^{38}$ which is fastened to the idler arm and to the frame of the machine is held in the upper position, as indicated in Figure 7 to bear against and engage a chain $H^{39}$ which engages the sprockets $H^{23}$ and $F^{2}$ by means of which the conveyor shaft, upon which the sprocket $F^{2}$ is mounted, is driven from the shaft $H^{21}$. $H^{40}$ is an idler sprocket carried upon a shaft $H^{41}$ which is mounted upon the frame as indicated particularly in Figures 5 and 7. An idler pulley $H^{42}$ is carried on a suitable shaft which is journaled in a pivoted arm $H^{43}$ which is supported on the frame and held downwardly by a spring $H^{44}$ as indicated in Figure 7. A chain $H^{45}$ engages the sprocket $H^{24}$, and is driven by it. It engages also the sprocket $E^{5}$ on the shaft $E^{6}$ of the horizontal conveyor. It engages the large sprocket $D^{7}$ of the beater, the idler $H^{40}$ and the idler $H^{42}$. Thus, when the sprocket $H^{24}$ is engaged with the clutch so as to move with the shaft $H^{21}$, that is with the parts in the position indicated in Figure 5, rotation of the shaft $H^{21}$ will rotate the sprocket $E^{5}$ to drive the horizontal conveyor and will rotate the beater at the same time.

Fixed on the connecting rod $B^{20}$ is an upwardly extending member I. Pivotally connected at one end to the member I is a link $I^{1}$. $I^{2}$, $I^{2}$ are upwardly extending frame members mounted preferably on the upper frame members B. They are braced by tie rods $I^{3}$, $I^{3}$. A shaft $I^{4}$ extends between the frame members $I^{2}$. Pivotally mounted upon it is a swinging lever arm $I^{5}$. This arm may be of any suitable construction, but is preferably formed of two members which have pivotally mounted between their lower ends the link $I^{1}$ and are joined adjacent their upper ends by a member $I^{6}$ which extends across them and is attached to them. It has thus the general shape of a wide and generally flat U. At their upper ends a similar member $I^{7}$ is positioned. This member, however, is oppositely faced, in that the arms of the U point upwardly. Pivoted also on the shaft $I^{4}$ is a second lever arm $I^{8}$ which is preferably formed of two laterally spaced members. These members are positioned between the two laterally spaced members which make up the arm $I^{5}$ and the inner or lower end of the member $I^{8}$ is positioned preferably just below the cross member $I^{6}$. Suitable cross members attaching the two parts of the member $I^{8}$ to each other are provided. Bolts $I^{9}$ are run through them and through the members $I^{6}$ and $I^{8}$ and have positioned about them compression springs $I^{10}$ which bear against plates or nuts $I^{11}$ at the lower end of the bolts $I^{9}$. This construction permits relative bending or rotary movement of the lever arms $I^{5}$ and $I^{8}$. Upward movement of the arm $I^{5}$ may thus continue when downward movement of the arm $I^{8}$ is prevented. At its outer end the arm $I^{8}$ carries pivotally mounted a downwardly depending frame structure $I^{12}$ which is preferably formed of two members pivoted between the arms of the lever $I^{8}$. These members carry compressing or tamping plunger $I^{13}$. Above the plunger and extending laterally from the frame $I^{12}$ is a block engaging member $I^{14}$. Movement of the connecting rod $B^{20}$ causes the composite lever formed of the members $I^{5}$ and $I^{8}$ and carrying the tamping plunger $I^{13}$ to move upward and downward, thus to tamp or press the hay or other material which is being baled. When the connecting rod is in the position shown in Figure 1, the lever has been swung into the downward position. In this position the piston $B^{18}$ has been withdrawn. As the piston is forced into the position shown in Figure 4, the lever arms $I^{5}$ and $I^{8}$ move upwardly and raise the plunger $I^{13}$ into the position shown in Figure 4. $I^{15}$ is a link or links, as there may be one or two. These links are pivoted at one end upon the support or supports $I^{2}$ and at the other upon the downwardly depending member $I^{12}$ which carries the plunger $I^{13}$ and the block engaging member $I^{14}$. It is of the same effective length as the member $I^{8}$ and thus serves to hold the member $I^{12}$ in vertical alinement no matter what its position.

Figure 3:
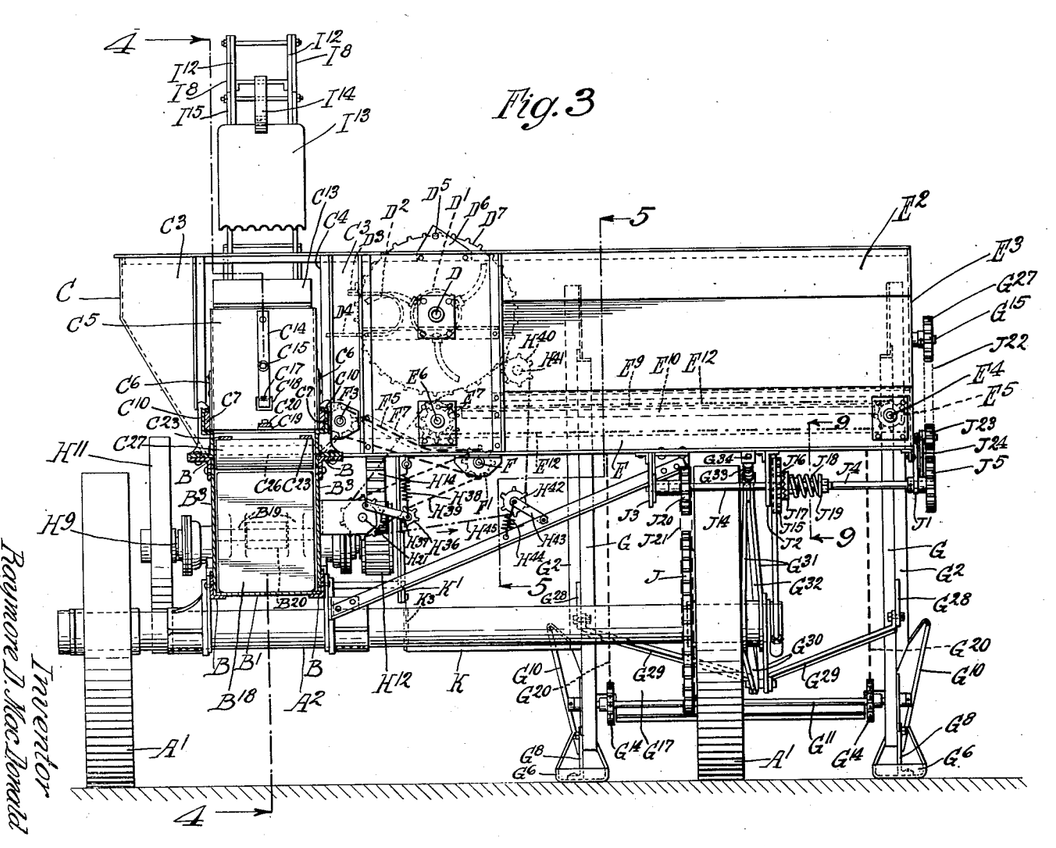
Figure 3 is a transverse vertical cross section, taken at line 3—3 of Figure 1, showing the plunger in the raised position.

J is a sprocket mounted about the axle $A^{2}$ and fastened to the right hand supporting wheel $A^{1}$ as indicated in Figure 3. $J^{1}$ is a bracket member depending from the framework which carries the horizontal conveyor. $J^{2}$ is a second bracket depending from the frame which carries the horizontal conveyor and $J^{3}$ is a third bracket depending from the same frame. These parts are shown generally in Figure 3 and in detail in Figures 9 and 10. A shaft $J^{4}$ is journaled in suitable bearings carried by the brackets $J^{1}$ and $J^{2}$ and has at its outer or free end a sprocket $J^{5}$. Adjacent its inner end the shaft $J^{4}$ carries a gear $J^{6}$ which gear has an outwardly extending notched or roughened portion $J^{7}$. The gear $J^{6}$ is not fixed to the shaft $J^{4}$. $J^{8}$ is a clutch member having a notched portion $J^{9}$ corresponding to and adapted to mate with the notched portion $J^{7}$ of the gear $J^{6}$. A spring $J^{10}$ tends normally to hold the clutch and sprocket in engagement and thus the sprocket is locked for rotation with the shaft $J^{4}$. A bell crank $J^{11}$ is pivoted as at $J^{12}$ and is connected with the clutch member so as to move it. A link $J^{13}$ connects one end of the bell crank $J^{11}$ with the member $G^{31}$. $J^{14}$ is a shaft supported in suitable bearings in the brackets $J^{2}$ and $J^{3}$. It has loosely mounted upon it a gear $J^{15}$ which meshes with the gear $J^{6}$. The gear $J^{15}$ has extending laterally from it a roughened portion $J^{16}$. A corresponding member $J^{17}$ which is roughened to mate with the member $J^{16}$ is slidably mounted upon the shaft $J^{14}$ and keyed to rotate with it and is normally held in engagement with the portion $J^{16}$ by a spring $J^{18}$ which is mounted about the shaft $J^{14}$ and bears against a plate $J^{19}$ upon the shaft. This construction tends normally to hold the gear $J^{15}$ so that it rotates with the shaft $J^{14}$ but in case of excessive pressure the member $J^{17}$ may yield outwardly against the spring to free the gear $J^{15}$ from the shaft so that rotation of the gear $J^{15}$ is not imparted to the shaft $J^{14}$. Adjacent its other end the shaft $J^{14}$ has fixed upon it a sprocket $J^{20}$. A chain $J^{21}$ extends about the sprocket J and the sprocket $J^{20}$ and thus rotation of the right hand wheel $A^{1}$ as shown in Figure 3 will rotate the sprocket J and by means of the chain $J^{21}$ will rotate the sprocket $J^{20}$ and through it the shaft $J^{14}$. When the parts are in the position shown in Figure 10 this rotation is transmitted through the gears $J^{15}$ and $J^{6}$ to the shaft $J^{4}$, rotating it and the sprocket $J^{5}$ which it carries. A chain $J^{22}$ engages the sprocket $J^{5}$ on the shaft $J^{4}$ and also engages the sprocket $G^{27}$ on the shaft $G^{15}$ of the pick-up conveyor and thus this shaft is rotated through movement of the chain $J^{22}$. $J^{23}$ is an idler which engages the chain $J^{22}$ as indicated particularly in Figure 8. It is carried on a pivoted arm $J^{24}$ which, by means of a spring $J^{25}$, is held in a position to exert tension upon the chain $J^{22}$.

A bracket K extends laterally inwardly from the pick-up conveyor as indicated particularly in Figure 3. A curved lever $K^1$ is pivotally mounted upon the rectangular frame as at $K^2$ and has attached to it a chain $K^3$ one end of which is attached to the bracket member K. The upper arm of the lever $K^1$ carries a dog $K^4$ and a handle and operating mechanism $K^5$ therefor. The dog is arranged to engage the notches in a quadrant $K^6$. When the parts are in the position shown in Figure 8, the upper arm of the lever $K^1$ is in such position that the dog is engaged adjacent the top of the quadrant and the pick-up is in contact with the ground. When it is desired to move the pick-up out of operative position, that is to say, out of contact with the ground, the lever arm is depressed, that is, it is moved downwardly along the quadrant and the dog is re-engaged to hold the parts in the raised position.

It will be realized that whereas I have herewith shown and described a practical operative device, nevertheless many changes might be made in the size, shape, number and disposition of parts without departing from the spirit of my invention and I wish, therefore, that my showing be taken as in a sense diagrammatic.

The use and operation of my invention are as follows:

The combine baler which forms the subject of this application may be used in stationary position as an ordinary baler. It may, however, be drawn through the fields where material to be baled is found and it may be arranged to pick up the material and to bale it as it moves and to discharge the bales. The operation of the baling machinery is essentially the same, whether the machine is stationary or being drawn through the fields and the baling mechanism is operated by power from some outside source as, for example, a tractor or other engine. The pick-up mechanism is operated in response to movement of the combine through the fields. As the combine is drawn, the pick-up is normally in the operative position shown for example in Figures 1 and 8, but it may be raised from that position and when so raised it is automatically thrown out of operation so that even when the combine is moved, the pick-up may be moved out of operative position and this movement automatically disconnects it from its drive and when it is in this inoperative position, movement of the combine does not cause movement of the pick-up conveyor.

With the parts in the position shown generally in Figures 1, 3, 4, and 8, the pick-up is in the operative position, the combine is connected to a tractor which has a power take-off connection and the latter is connected to the driving mechanism of the baling assembly. Thus the latter is in operation in response to movement of the tractor engine and as the combine is drawn forward through the fields the pick-up conveyor is operated in response to the movement of the combine.

Figure 10:
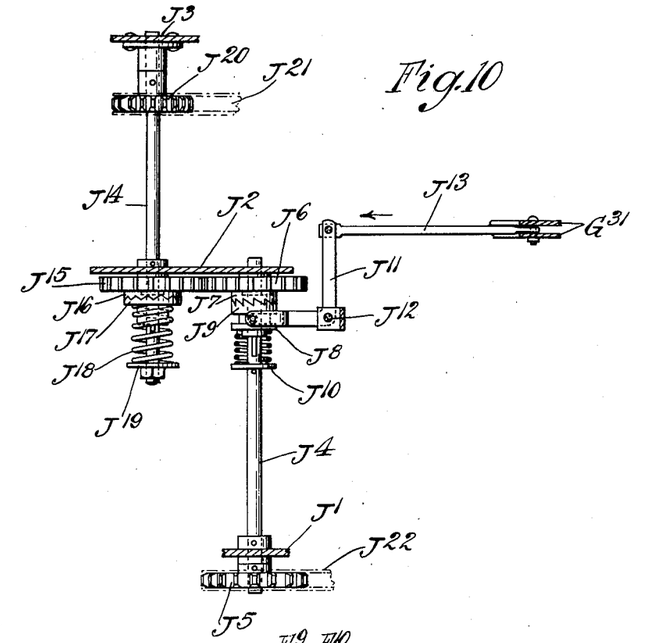
Figure 10 is a horizontal sectional detail, taken at line 10—10 of Figure 9.

The drive of the pick-up conveyor is as follows: With the parts in the position shown, forward movement of the combine rotates both of the wheels $A^1$ and rotates also the sprocket J which is attached to the right hand wheel $A^1$ as shown in Figure 3. The chain $J^{21}$ which engages the sprocket J rotates the sprocket $J^{20}$ and the shaft $J^{14}$ which carries it. Thus the gear $J^{15}$ which is upon the shaft $J^{14}$ is rotated and the gear $J^6$ which engages the gear $J^{15}$ and the shaft $J^4$ upon which the gear $J^6$ is mounted, is rotated, thus rotating the sprocket $J^5$ and by means of the chain $J^{22}$ which engages the sprocket $J^5$ the sprocket $G^{27}$ on the pick-up conveyor shaft $G^{15}$ is rotated. Should any obstacle to the movement of the conveyor develop, and should the resistance become sufficient to endanger the parts, the resistance to movement will be sufficient before breakage can occur to cause slippage of the members $J^{16}$ and $J^{17}$, since the member $J^{17}$ can yield outwardly to permit this slippage. If the pick-up conveyor is to be thrown out of operation, the lever $K^1$ is moved from the position shown in Figure 8 to a lower position, thus raising the pick-up conveyor out of contact with the ground. As this occurs, the members $G^{30}$ and $G^{31}$ which are fastened together and are fastened to the pick-up conveyor frame by the link $G^{29}$, are rotated in a counter-clockwise direction from the position shown in Figure 8. Rotation of the member $G^{31}$ in this direction moves the link $J^{13}$ in the direction of the arrow as indicated in Figure 10, and this movement is transmitted through the bell crank $J^{11}$ to move the clutch part $J^9$ out of engagement with the member $J^7$ on the gear $J^6$. Thus the parts are declutched and so long as they remain in the declutched position the shaft $J^4$ is not rotated and the pick-up conveyor will not be rotated. Thus movement of the pick-up conveyor out of its operative position automatically declutches the pick-up conveyor drive.

The drive of the baling mechanism is as follows: The power take-off connection rotates the shaft $H^5$ which, through the gears $H^8$ and $H^{10}$ rotates the shaft $H^9$. Rotation of this shaft through the pinions $H^{15}$ rotates the double gear $H^{16}$. This gear carries with it the connecting rod $B^{20}$ which causes the piston $B^{18}$ to reciprocate within the baling cavity or chamber and as hay or other material to be baled is fed to the baling cavity it is compressed by the successive strokes of the piston $B^{18}$. Movement of the connecting rod $B^{20}$ moves the bracket $I^1$, the link $I^2$, the combined lever $I^5$, $I^8$, from the position shown, for example in Figure 1 to that shown in Figure 4, Figure 1 being approximately the extreme downward position and Figure 4 being approximately the extreme upper position. As this movement occurs the plunger $I^{15}$ is raised and lowered, thus serving to carry material to be baled into the baling compartment and to compress it.

Figure 1:
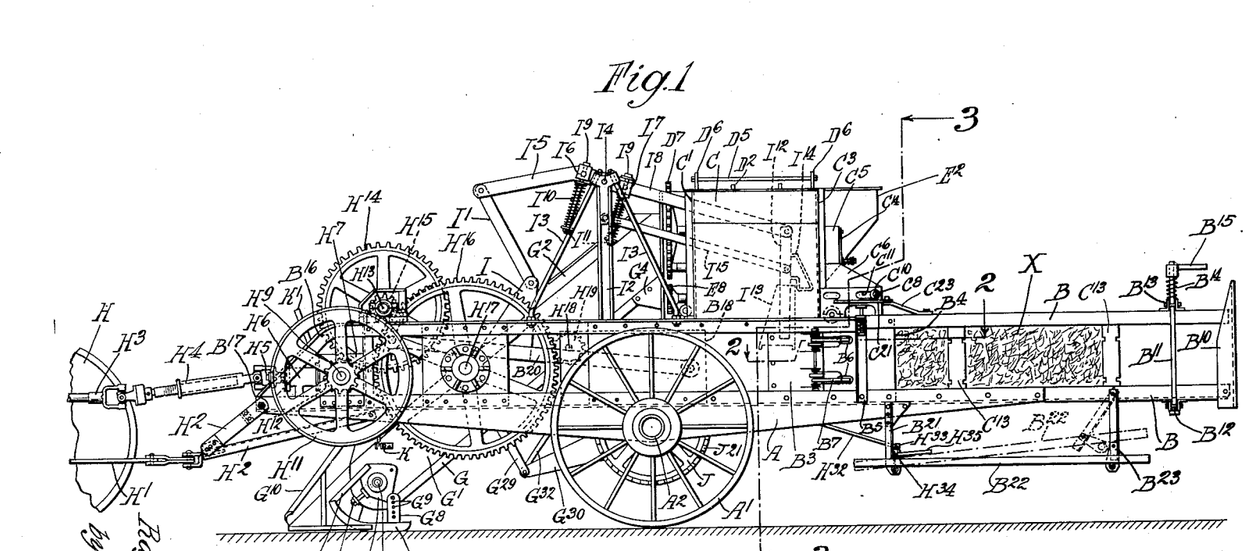
Figure 1 is a side elevation of the machine.
Figure 2:
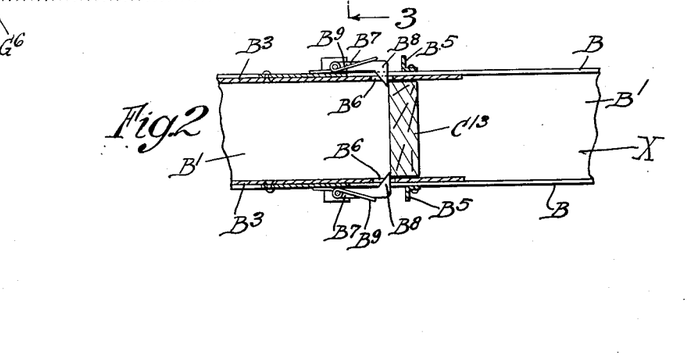
Figure 2 is a detailed horizontal longitudinal section taken at line 2—2 of Figure 1.
Figure 4:
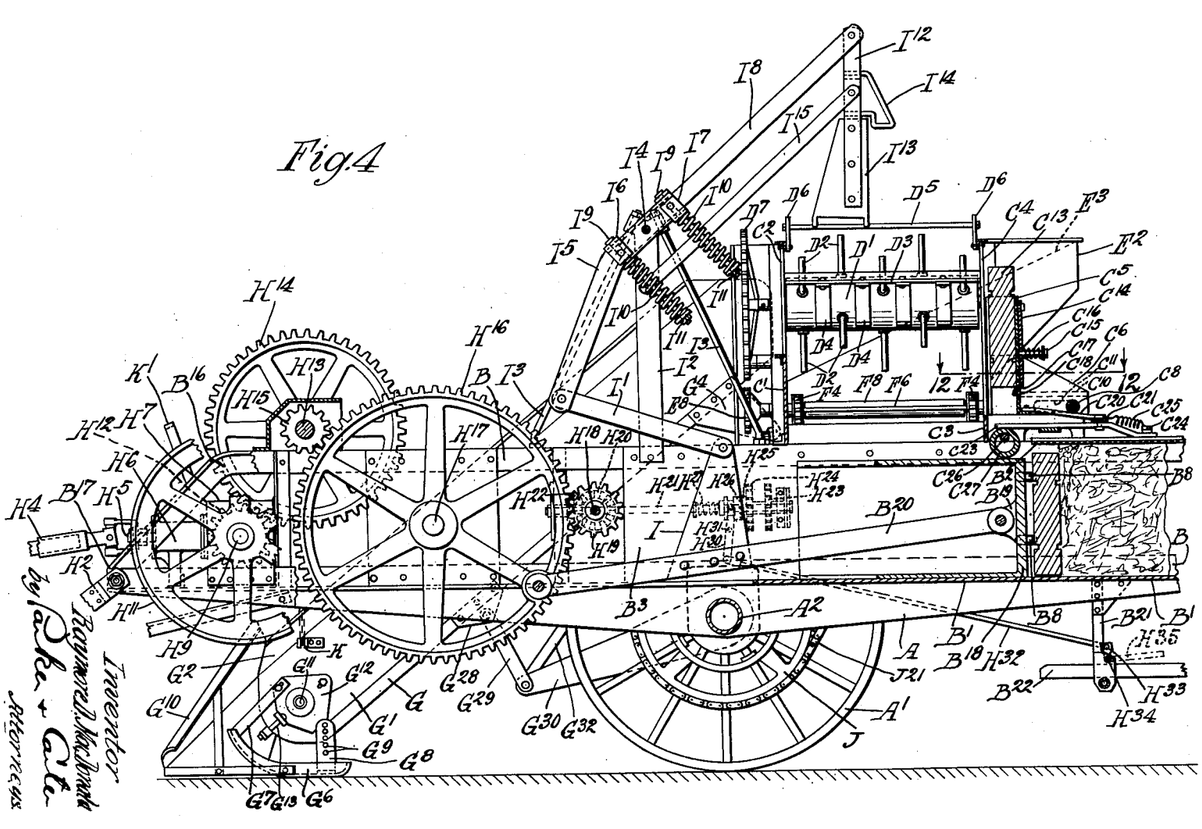
Figure 4 is a fragmentary vertical longitudinal cross section, taken at line 4—4 of Figure 3.
Figure 12:
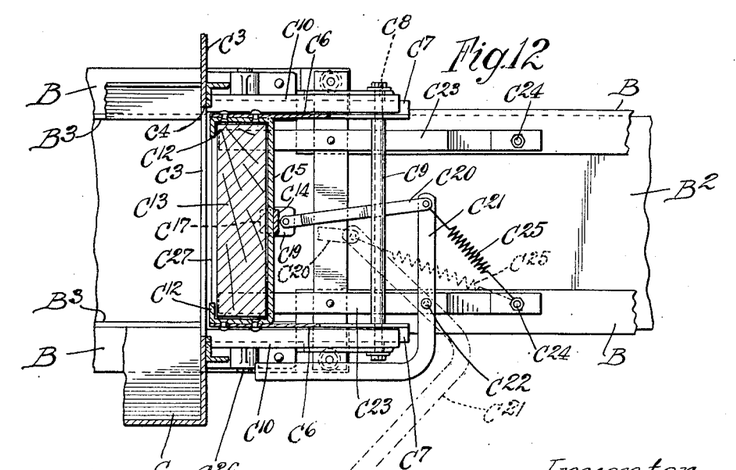
Figure 12 is a longitudinal horizontal cross sectional detail, taken at line 12—12 of Figure 4.
Figure 13:
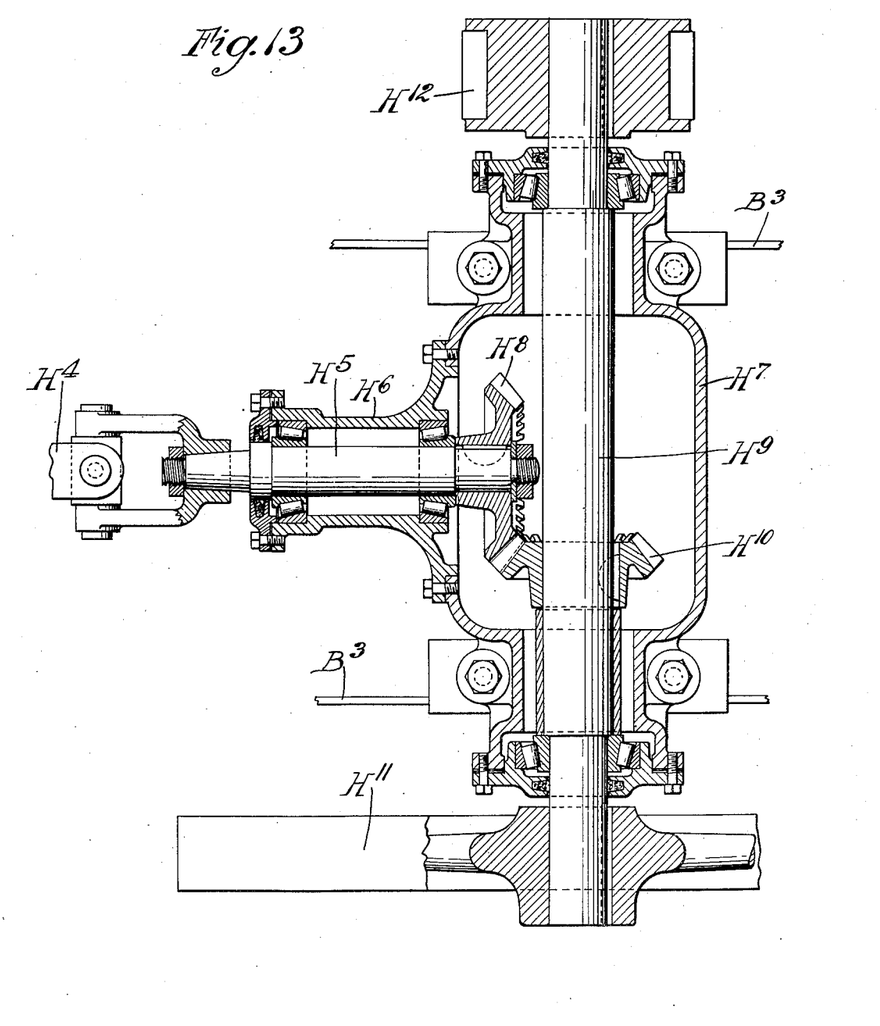
Figure 13 is an enlarged horizontal sectional view through the transmission, at the point of connection to the power take-off.

Before the baling operation commences, the hand lever $C^{21}$ is moved from the full line position of Figure 12 into the dotted line position of that figure. Thus the member $C^5$ carrying the block $C^{13}$ is moved forward from the position shown in full lines in Figure 12 to the position in Figure 11. In that position, the block $C^{13}$ will be engaged by the member $I^{14}$ and against the friction of the spring $C^{14}$, $C^{17}$ will be forced downwardly into the baling cavity or chamber and will be moved to the right as shown in Figure 4 by the reciprocation of the piston $B^{18}$. After a block $C^{13}$ has been moved into position by the piston $B^{18}$, it is moved to the right as shown in Figures 2 and 4, into contact with the points B⁸ of the dogs B⁷. Further movement of the block C¹³ in response to reciprocation of the piston B¹⁶ will move the dogs outwardly against resistance of the springs B⁹ and so permit the block to be moved past the dogs into the position shown in Figure 2. The dogs then return to the position shown in that figure and prevent the block from being forced backward, as for example by the pressure of material which has been moved beyond it and which is under compression and which might tend to spring backward to the left as shown in Figures 2 and 4, and to carry the block with it. Successive blocks are fed into the machine at suitable intervals and material is fed into the machine and is carried into the compressing chamber and compressed by the plunger and piston and is moved out of the compression chamber and is fastened together in any suitable manner after it has moved from the compression chamber to the rear to the region indicated generally by the letter X, as shown in Figures 1 and 2. The angular members B are drawn together by the rods B¹¹ of the compression members B¹⁴ and B¹⁵ sufficiently to furnish adequate resistance or friction to the movement of the blocks, thus retaining the compression on the bale from above and controlling the movement of the blocks, and consequently of the bales, through the machine toward the point of discharge. The resistance and friction may be varied by manipulation of the members B¹⁵ to vary the compression applied to the spring B¹⁴ and consequently to the members B. The bales may be discharged from the rear of the rectangular frame formed of the angles B and the successive blocks are removed from the rear of the machine and used again. The bales may be deposited on the ground or into a wagon or in any other manner.

In addition to the pick-up conveyor which has been described above, two other conveyors are embodied in the machine, one a horizontal conveyor which receives material from the pick-up conveyor and a second, a short elevated conveyor which receives material from the horizontal conveyor and drops it into or moves it toward the baling cavity. The double gear H¹⁶ engages a pinion H¹⁹ on a shaft H¹⁸ which carries also a beveled pinion H²⁰ which meshes with a beveled pinion H²² on a shaft H²¹. The shaft H²¹ has fixed upon it a sprocket H²³ which drives a chain H³⁹ which meshes with the sprocket F² on a conveyor drive shaft F. These driving connections are shown in detail in Figure 7 and through this mechanism the short elevating or upwardly inclined conveyor shown in detail in Figure 7 is operated. Mounted loosely on the shaft H²¹ is also a sprocket H²⁴ which, when in the position indicated in Figure 5, is locked to move with the shaft by means of the clutch H²⁶, the spring H²⁷ normally holding the parts in clutched or operative position. A chain H⁴⁵ is driven by the sprocket H²⁴ and engages a sprocket E⁸ on the horizontal conveyor shaft E⁶, this shaft thus being driven from the shaft H²¹. The chain H⁴⁵ also engages a driving sprocket D⁷ on the beater shaft D. Thus the chain H⁴⁵ also drives the beater from the shaft H²¹. The clutch member H²⁶ is provided with a clutch operating lever H³⁰ which, by means of a link H³² is connected to a foot pedal H³⁵. When it is desired to stop operation of the conveyors which move the material from the pick-up conveyor to the compression chamber, the pedal H³⁵ is depressed, the clutch operating lever H³⁰ is rotated to move the clutch member H²⁶ to the right, as indicated in Figure 5, and thus to disconnect the sprocket H²⁴ from the shaft H²¹ and thereby to stop movement of the beater and the horizontal conveyor. In the particular form of the invention shown herewith the short elevating or inclined conveyor is not declutched by this particular operation and continues to move as do the piston and plunger.

The tubular member C²⁷, mounted upon the rod C²⁶, is normally held in the position shown in Figure 3 by the spring C²³. It serves to hold the material being compressed to prevent its escaping backward or upward and while it can be moved upwardly, when pressure sufficient to cause the spring C²³ to yield occurs, ordinarily it will not be displaced and will remain in the position shown in Figure 4, in which position it contacts or closely approaches the top of the piston B¹⁶ when the latter moves under it.

I claim:

1. In combination, a vehicle frame, running gear for the frame including an axle and a single pair of wheels carried thereby, said axle being positioned intermediate the ends of the frame, baling mechanism mounted on the frame rearwardly of said axle, transmission mechanism mounted on said frame forwardly of said axle, bale supporting and discharging mechanisms on the frame rearwardly of said baling mechanism, a pick-up mechanism for raising material to be baled, said pick-up mechanism including a conveyor frame, means for pivotally supporting the upper end of said frame on said vehicle frame substantially over said axle, with the lower end thereof engaging the ground well in advance of the axle, and means for connecting the vehicle frame and transmission mechanism to a tractor, the several mechanisms carried by the vehicle frame being positioned thereon with respect to the axle to maintain the entire apparatus in a substantially balanced condition, with respect to said axle, and means for floatingly supporting the lower end of said pick-up conveyor frame, whereby to maintain the same in contact with the ground at all times.

2. In combination, a vehicle frame, running gear for the frame including an axle and a single pair of wheels carried thereby, said axle being positioned intermediate the ends of the frame, baling mechanism mounted on the frame rearwardly of said axle, transmission mechanism mounted on said frame forwardly of said axle, bale supporting and discharging mechanisms on the frame rearwardly of said baling mechanism, a pick-up mechanism for raising material to be baled, said pick-up mechanism including a conveyor frame, means for pivotally supporting the said frame substantially over said axle, with the lower end thereof engaging the ground well in advance of the axle, and means for connecting the vehicle frame and transmission mechanism to a tractor, the several mechanisms carried by the vehicle frame being positioned thereon with respect to the axle to maintain the entire apparatus in a substantially balanced condition, with respect to said axle, and means for floatingly supporting said pick-up conveyor frame, whereby to maintain the same in contact with the ground at all times.

3. In combination, a vehicle frame, running gear for the frame including an axle and a single pair of wheels carried thereby, said axle being positioned intermediate the ends of the frame, baling mechanism mounted on the frame rearwardly of said axle, transmission mechanism mounted on said frame forwardly of said axle, bale supporting and discharging mechanisms on the frame rearwardly of said baling mechanism, a pick-up mechanism for raising material to be baled, said pick-up mechanism including a conveyor frame, means for pivotally supporting the said frame substantially over said axle, with the lower end thereof engaging the ground well in advance of the axle, means for connecting the vehicle frame to a tractor, the several mechanisms carried by the vehicle frame being positioned thereon with respect to the axle to maintain the entire apparatus in a substantially balanced condition, with respect to said axle, and means for floatingly supporting said pick-up conveyor frame, whereby to maintain the same in contact with the ground at all times.

RAYMORE D. MACDONALD.